(12) United States Patent
Carter et al.

(10) Patent No.: US 6,466,891 B1
(45) Date of Patent: Oct. 15, 2002

(54) SYSTEM FOR PROVIDING AN ESTIMATE OF THE LOCATION OF AN UNDERSEA OBJECT

(75) Inventors: G. Clifford Carter, Waterford; Harold J. Teller, Lebanon, both of CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 147 days.

(21) Appl. No.: 09/663,421

(22) Filed: Sep. 15, 2000

(51) Int. Cl.[7] .......................... G06F 15/00; G01S 15/00
(52) U.S. Cl. .............................. 702/150; 367/8; 367/88; 367/93; 367/99; 367/110; 367/111; 367/149; 367/153; 701/219; 706/24
(58) Field of Search .................... 702/150, 152, 702/155, 158; 340/992, 993; 367/88, 93, 99, 110, 111, 153; 701/219

(56) References Cited

U.S. PATENT DOCUMENTS

| | | | | |
|---|---|---|---|---|
| 4,060,790 A | * | 11/1977 | Raff | 367/93 |
| 4,209,853 A | * | 6/1980 | Hyatt | 367/8 |
| 4,590,569 A | * | 5/1986 | Rogoff et al. | 701/219 |
| 5,031,157 A | * | 7/1991 | Anderson et al. | 367/110 |
| 5,065,371 A | * | 11/1991 | Leavell et al. | 367/111 |
| 5,184,330 A | * | 2/1993 | Adams et al. | 367/111 |
| 5,231,609 A | * | 7/1993 | Gear | 367/99 |
| 5,504,719 A | * | 4/1996 | Jacobs | 367/149 |
| 5,537,380 A | * | 7/1996 | Sprankle et al. | 367/111 |
| 5,537,511 A | * | 7/1996 | DeAngelis et al. | 706/24 |
| 5,657,296 A | * | 8/1997 | Carter | 367/153 |
| 5,946,272 A | * | 8/1999 | McDonald et al. | 367/88 |

* cited by examiner

*Primary Examiner*—John S. Hilten
*Assistant Examiner*—John Le
(74) *Attorney, Agent, or Firm*—Michael J. McGowan; James M. Kasischke; Michael F. Oglo

(57) ABSTRACT

A system is disclosed that provides. a sonar operator with the most likely range to a target of interest. The system generates and displays a contour based on ship's parameters, target parameters, environmental data, and operator parameters. The sonar operator can vary many of the parameters in "what if" scenarios so as to generate groups of contours for preselected probabilities of detection. Contours can be used to show the actions that should be taken to ensure a favorable outcome.

13 Claims, 4 Drawing Sheets

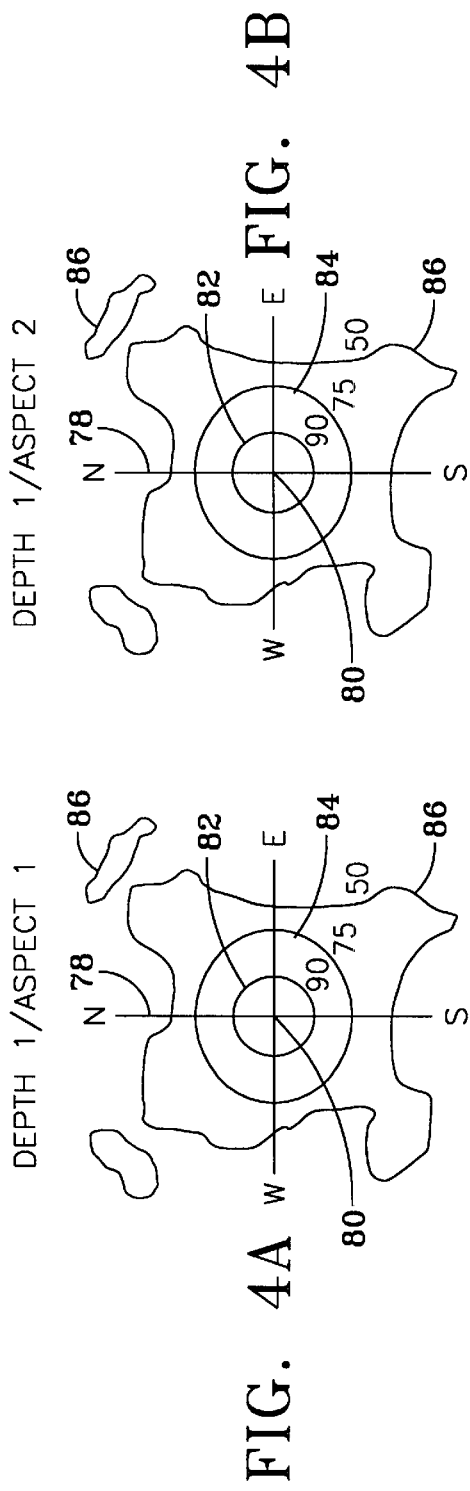
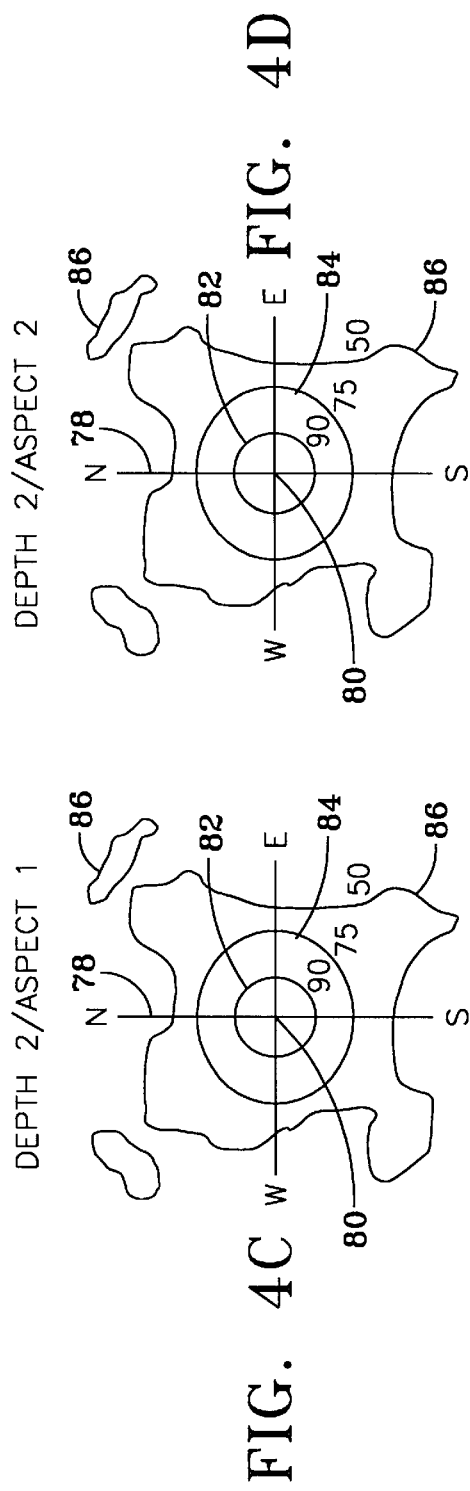
FIG. 4A  FIG. 4B  FIG. 4C  FIG. 4D

SYSTEM FOR PROVIDING AN ESTIMATE OF THE LOCATION OF AN UNDERSEA OBJECT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a sonar system and, more particularly, to a system that provides a sonar operator with the most likely range of the target of interest.

(2) Description of the Prior Art

Sonar systems are used for analyzing acoustic energy to determine the identification of the acoustic energy and the location of the source of acoustic energy, whether the source be a ship or a school of fish.

Sonar systems are known and some of which are described in U.S. Pat. Nos. 5,065,371; 5,184,330; 5,537,380; and 5,657,296. Further, systems for analyzing geographic data by interactively displaying selected properties to an operator are known, and one such system is disclosed in U.S. Pat. No. 4,467,461.

Sonar systems may have a range of the day display. The traditional range of the day display provided to a sonar operator is a single "best" estimate of the detection range to a threat of interest or acoustic source and is based on expected own ship, target, environmental, and operator selectable sonar parameters. Sonar systems having such a range of display include military legacy SONAR systems AN/BQQ-5, AN/BSY-1, AN/BSY-2, AN/SQQ-89, as well as, commercial fish finding sonars. The estimate is provided in a non-interactive manner by use of static estimates determined by the sonar operator.

It is desired that the estimate of range to an expected acoustic energy source or threat submarine be provided in an enhanced interactive manner. The prior art range estimate can also be enhanced by providing a graphical tool that allows the sonar operator the flexibility of varying critical own ship, environmental, and operator parameters, in "what if" scenarios with each "what if" scenario leading to an improved estimate.

SUMMARY OF THE INVENTION

It is a first object of the present invention to provide a system that allows the operator to visualize the process for detecting undersea objects and improves the sonar operator's ability to find schools of fish or submarines in a shorter time.

It is another object of the present invention to provide for range contours related to different levels of probability of detection, target aspect angle, different depths, and different operational conditions.

It is yet another object of the present invention to provide for range contours in various rendering by utilizing different shapes and color scales to more definitively define the range contour.

It is still a further object of the present invention to utilize a real time linkage to satellite communication systems that provide information associated with an existing surface traffic, existing surface traffic noises, or weather, all such information being used to provide more realistic sonar performance predictions.

Accordingly, it is the general purpose and object of the present invention to provide a system that presents to a sonar or ship operator the most likely range to a target of interest. The system provides range estimates to targets of interest and counter detection ranges based on operator interaction with a range of day display. The system provides the sonar operator with interactive sessions allowing for a back-and-forth dialogue between the sonar operator and the system itself.

The system providing for the interactive dialogue generates range contours determined by the probability of the detection of the undersea object. The system comprises a computer, a display, and input means. The computer has a plurality of ports and is responsive to application programs. The display is operatively connected to some of the ports of the computer. The input means is also operatively connected to some of the ports of said computer. The sonar operator can use the input means for selection of parameters that are directed into the computer and manipulated by application programs having a computational model. The selectable parameters comprise own ship's parameters, target parameters, environmental parameters, and operator parameters. The application programs manipulate the parameters in accordance with the computational model to generate at least one contour having a predetermined probability of detection and causing at least one contour to be rendered on the display.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein:

FIG. 4 is composed of FIGS. 4A, 4B, 4C, and 4D which cumulatively illustrate the graphics involved with a situation of comparing two own ship's depths to two interrelated target aspects.

DESCRIPTION OF THE PREFERRED EMBODIMENTS

Figure 1:
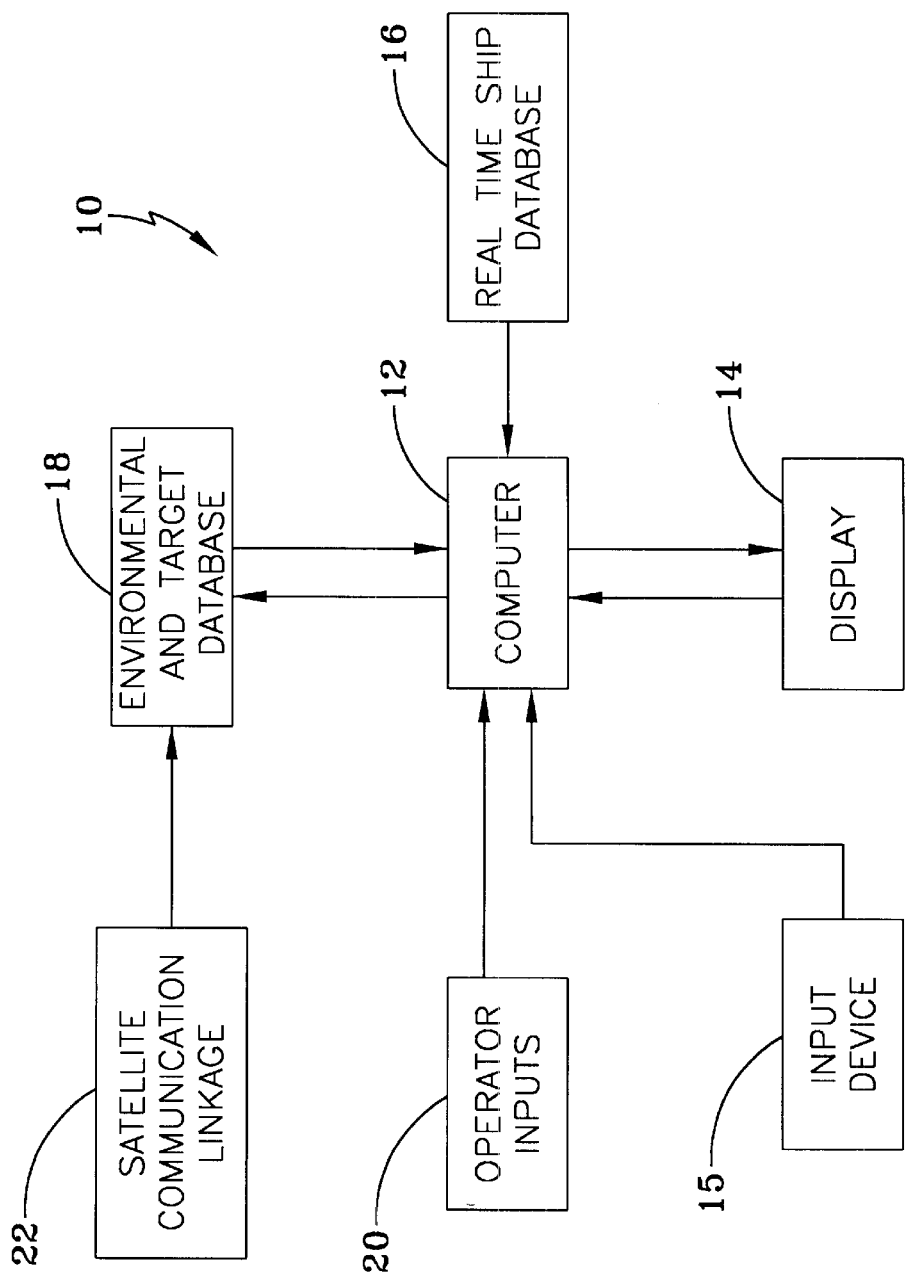
FIG. 1 is a block diagram of the present invention.

With reference to the drawing, there is shown in FIG. 1, a block diagram of the system 10 used on board a ship providing for an interactive dialogue with a sonar operator. The interactive dialogue allows the sonar operator to detect the presence and location of a target of interest and to generate range contours determined by probabilities of detection. The system comprises a computer 12 having a plurality of ports and responsive to application programs of the present invention. The system further comprises a display 14 connected to some of the ports of the computer 12 and a input device 15, also connected to some of the ports of the computer 12, which may be a mouse, a track ball, a touch screen or some other pointing device that allows the operator selection for input to the computer 12. Utilizing input device 15, the operator selects parameters representative of real time ship database 16 parameters, an environmental and target database 18, and operator inputs 20.

The real time ship database parameters 16 comprise latitude, longitude, depth, date, time, course, speed, array heading, array depth, ambient noise level of the environment, depth of the bottom below the ship, and the ship's radiated noise.

The environmental and target database 18 comprises target parameters consisting of depth, aspect, speed, spectral characteristics, and radiated noise. The environmental and target database 18 further comprises environmental parameters which include sea state, sound velocity profile, and shipping density. In addition, the environmental and target database 18 includes threat data, sonar receiver operating characteristics, sonar array characteristics of directivity index (DI), array self noise (LE), ambient noise (NL), sonar system processing gain (NRD), and own ship radiated noise. NRD is the minimum detectable signal given a sonar processing gain which includes passive narrow band and passive broad band.

The operator inputs 20 primarily comprises selection of the probability of detection as further described below. The operator inputs 20 also include "what-if" slider bars allowing the operator to examine the effects of changes in own ship speed, own ship depth and other controllable factors. These controllable factors include: assumed own ship speed; assumed own ship depth; operational array; ambient noise level; assumed target depth; assumed target; assumed target spectrum; assumed target speed; assumed target radiated noise; and sonar system identification.

The system 10 further comprises a satellite communication linkage 22 that allows the satellite, in a manner known in the art, to supply information comprising existing surface traffic targets, existing surface traffic noise, and existing surface weather. All of this information is utilized by the present inventor to improve sonar predictions to be described.

Figure 2:
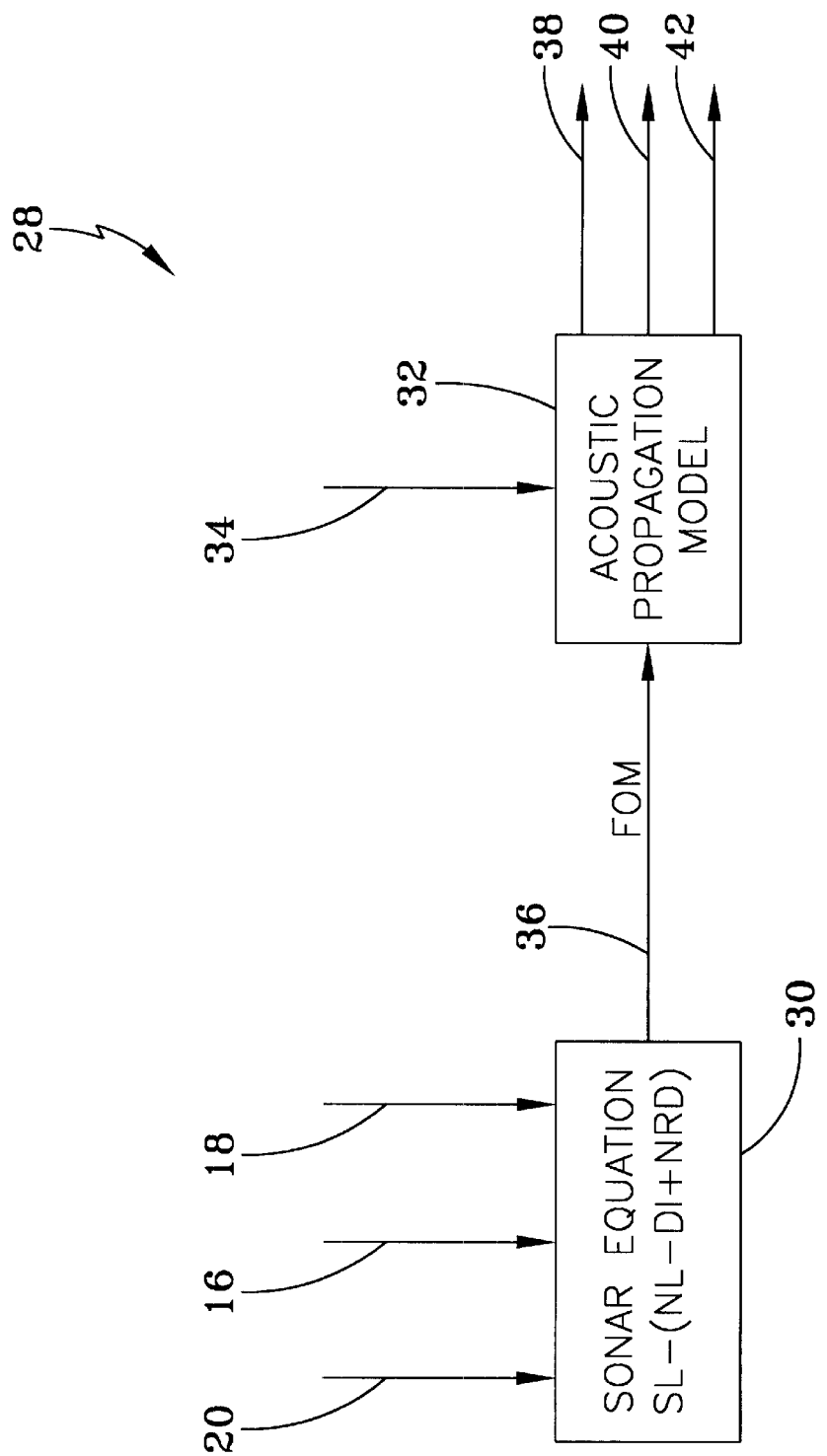
FIG. 2 illustrates the computation model associated with the application programs of the present invention.

The computer 12 operates in response to application programs 28, which may be further described with reference to FIG. 2. FIG. 2 illustrates application programs 28 which primarily consist of sonar equation 30 and an acoustic propagation model 32. The sonar equation 30 receives inputs from functional units 16, 18, and 20 shown in FIG. 1.

The sonar equation 30 may be expressed by the below equation (1):

$$FOM = SL - (NL - DI + NRD) \qquad (1)$$

where FOM is the figure of merit,
SL is the target source level,
NL is the ambient noise array self noise,
DI is the array directivity index, and NRD is the minimum detectable signal given sonar processing gain and is sometimes referred to as recognition differential.

The sonar equation (1) is well known and further details thereof may be found in the text entitled "Principles of Undersea Sound for Engineers," Chapter 2 pages 16–28, of Robert J. Urick, published by McGraw Hill Inc., copyrighted 1967, and incorporated by reference herein. It should be noted that the text of R. J. Urick replaces the term NRD with the term DT more fully described therein as "detection threshold."

The sonar equation (1) yields FOM quantities 36 which are representative of the transmission loss at the instant when the sonar equation is satisfied, the FOM gives an immediate indication of range at which the target can be detected. The FOM quantities 36 are routed to the acoustic propagation model 32 which, as indicated by arrowed 34, also receives ship's measured sound velocity profile and environmental data including sea state, as well as historical data including previously measured sound velocity profiles and bottom depths.

The acoustic propagation model 32 is well known and further details thereof may be found in the text entitled "Sonar and Underwater Sound," Chapter 2, pages 9–33, of Albert W. Cox, published by D.C. Heath and Company, copyrighted 1974, and herein incorporated by reference. The acoustic propagation model 32 yields functions 38, 40, and 42 that respectively represent the probability of detection (Pd), range to threat, and counter detection range.

Figure 3:
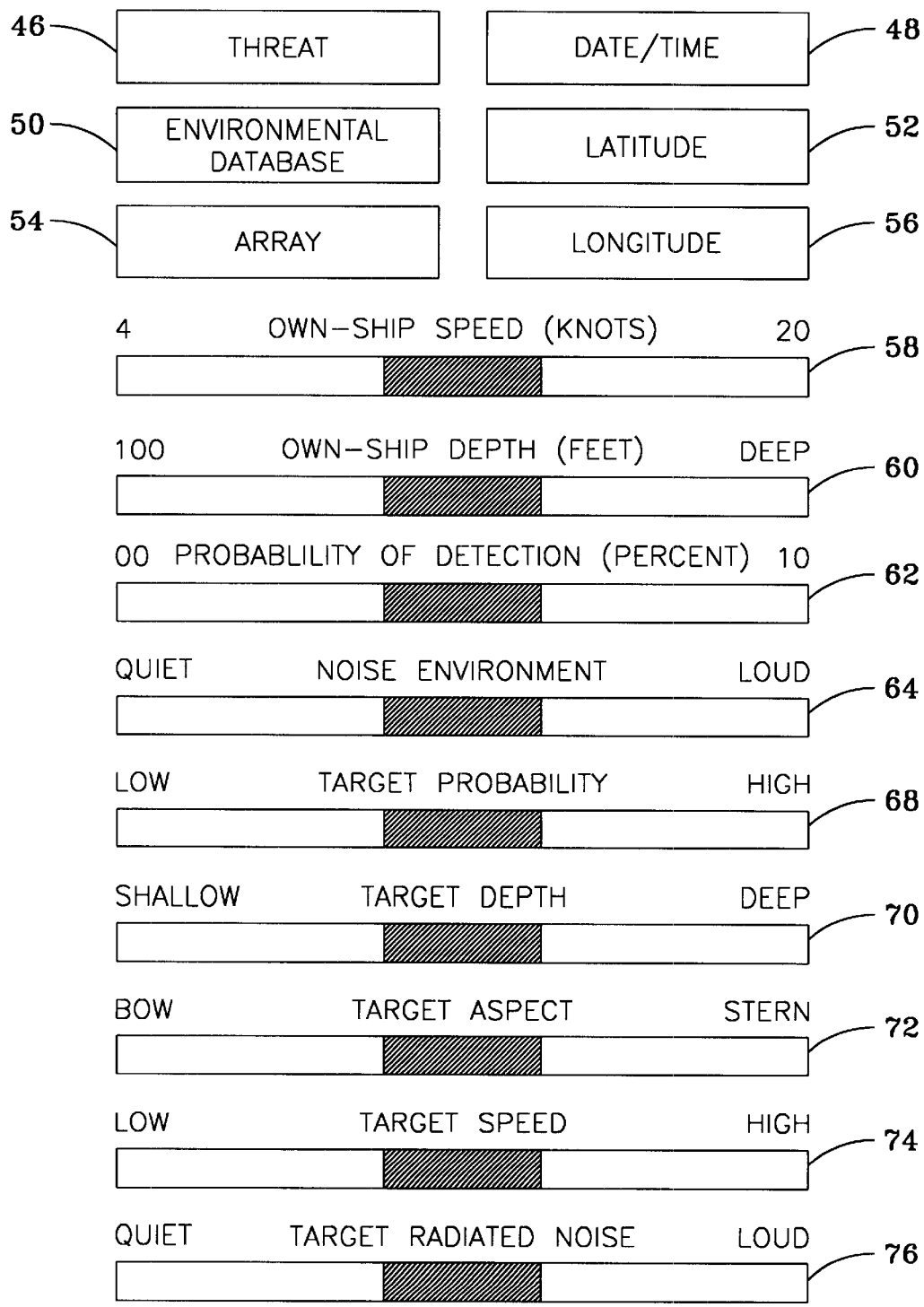
FIG. 3 illustrates operator selectable parameters utilized for the computation model of the present invention to determine the probability of detection, range of interest and counter detection range.

In operation, the system 10 provides the sonar operator with the ability to generate "what if" scenarios, wherein the sonar operator has an interactive dialogue with the system 10. With such scenarios, real time ship data is used to set the initial conditions for the system 10 from which the operator can provide operator inputs 20. The environmental and target database 18 brings in parameters that are not available from the real time ship database 16 system, as well as information on the threat of interest. The primary element of the computational model of FIG. 2 is the sonar equation (1) that derives the FOM quantities 36. The elements of the FOM quantity vary by variation in various inputs, and the final FOM quantities are applied to the acoustical propagation model 32. The outputs of the acoustic propagation model 32 are the probability of detection (Pd) 38, range to threat 40, and the counter detection range 42. The interactive back-and-forth dialogue between the operator and the system 10 and thus, the "what if" scenario, can be further described with reference to FIG. 3 illustrating operator selectable parameters 44, each of which has a reference number and a general classification.

In operation, the operator selections are made with a track ball or pointing device previously described with reference to input device 15 of FIG. 1. The selection of these parameters are responded to by the computational model (sonar equation (1) and the acoustic propagation model) developing at least one, but preferably four range contours, each having a predetermined probability of detection, and these range contours are rendered on display means 14, with a typical display array being shown in FIG. 4.

FIG. 4 is composed of FIGS. 4A, 4B, 4C, and 4D. FIG. 4 shows a situation of comparing two own ship's depth and against two target aspects. Each of the renditions shown in FIGS. 4A, 4B, 4C, and 4D is labeled depth/aspect, and it is preferred that all of the plots related to the present invention carry the depth/target aspect labeling.

For the scenario of FIG. 4, FIG. 4A represents range contours of the associated ship having a Depth 1 and dealing with a target having an Aspect 1. FIG. 4B represents range contours of the associated ship having a Depth 1 (same as FIG. 4A) and dealing with target having an Aspect 2. FIG. 4C represents range contours of the associated ship having a Depth 2 and dealing with a target having an Aspect 1. Finally, FIG. 4D represents range contours of the associated ship having a Depth 2 (same as FIG. 4C) and dealing with a target having an Aspect 2.

In another example, the operator can select up to three parameter scenarios for additional plots, each plot being a function of the probability of detection (Pd). The inputs from sources 16, 18, and 20 are directed in to the application programs 28, in particular, the computational model shown in FIG. 2.

The computational model manipulates the environmental data, threat data, and own ship's characteristic data. The environmental data consists of historical data for particular operational areas or recent sound velocity profiles (SVP) taken on board a vessel, such as a submarine in which system 10 finds application. The threat data commonly consists of spectral and radiated noise of the expected threat to be encountered. The real time ship database 16 commonly consists of sonar array information such as, self noise characteristics, array gain, and signal processing gain.

With reference to FIGS. 2 and 3, the computational model is initialized with the environmental and threat database 18 based on date/time 48, latitude 52 and longitude 56. Current sound velocity profile parameters may also be used, if available. The expected threat data 46 is also loaded by and is based on operator selection. The detection array used with the sonar may be either a spherical hull or towed array and such information 54 is also selected by the operator. The operator may then select contour plot label, Depth 1/Aspect 1 and select current own ship's depth 60 and speed 58 and noise environment 64. The target parameters are selected by the operator next. The target's depth 70, aspect 72 and speed 74 are selected by the operator. The target radiated noise 76 tracks those settings (depth, aspect and speed), but the operator is allowed to change the target's radiated noise 76 based upon current updated information.

The operator can utilize the contents of FIG. 4 to determine the probability of detection of a target. FIG. 4, which includes FIGS. 4A, 4B, 4C, and 4D, has an axis 78 and an origin 82. First, second, third and fourth contour plots are respectively displayed in FIGS. 4A, 4B, 4C, and 4D, each having contours defined by reference numbers 82, 84 and 86 which are referenced to the axis 78 and to the origin 80. The reference number 86 is being used twice to define the main region and broken-away portions thereof. Although contours 82, 84 and 86 are the same in FIGS. 4A–4D it is anticipated that they will vary by Aspect and Depth or by the chosen parameters.

After all the selections have been made by the operator, a first contour plot FIG. 4A will be displayed. Then three. contours will be shown for preselected probabilities. Targets located within first contour 82, defined by reference numbers 80 and 82 as seen, for example in FIG. 4A, have a greater than 90% probability of detection. Targets located between the first contour 82 and the second contour 84 have a 75% probability of detection. Targets located between the second contour 84 and the third contour 86 have a 50% probability of detection.

Once the operator is presented with four contours, the operator can change the probability of detection (Pd) by selecting a contour (FIG. 4A) and changing its probability of the detection (Pd) value 68. The three remaining plots, FIGS. 4B, 4C, and 4D can now be used as a "what if" situation in which the operator is allowed to optimize the detection range. The operator continues the interactive sessions with a back-and-forth dialogue with system 10 until the optimum detection range is ascertained and is shown on the display of FIG. 4A.

It should now be appreciated that the practice of the present invention provides the sonar operator with the most likely range of the target of interest. The range is estimated based on own ships parameters (i.e., latitude, longitude, depth, date/time and speed), target parameters (i.e., depth, aspect, speed, spectral characteristics and radiated noise), environmental data (i.e., sea state, sound velocity profile, and shipping density) and operator parameters (i.e., probability of detection). The sonar operator can utilize "what if" scenarios for generating a range of contours and ascertaining the most probable range for the target of interest.

Although the above description utilized concentric contours, shown in FIG. 4 for three probabilities, a continuous color plot could also be used with a color scale on the side. In lieu of the concentric contours, concentric volumes could be used to show continuous variation with, for example, depth or aspect. Automatic searching could also be done to create optimum operating conditions. Further, as previously mentioned, the system 10 includes a satellite communication linkage that allows for the application programs of the present invention to be provided with existing surface traffic noises, or weather, each contributing and aiding in providing more realistic x versus y sonar predictions.

Further, a single display with "drill down" (known in the art) capability could also be provided, as well as a display of x versus y in lieu of the circular display could be used. Further, a relative bearing display in lieu of a true N-S-E-W display could be used. In addition, automatic alerts and contour detection ranges could be shown by monitoring own ship's radiated noise events and displaying range differences between the ship and the target.

It will be understood that various changes in the details, steps and arrangements of parts, which have been herein described and illustrated in order to explain the nature of the invention, may be made to those skilled in the art within the principle and scope of the invention as expressed in the independent claims.

What is claimed is:

1. A system for displaying the estimated location of a target from a ship comprising:

a computer;

a display in communication with said computer;

an input means responsive to an operator and in communication with said computer for receiving operator parameters and transmitting said operator parameters to said computer, said operator parameters comprising operational array selection and sonar system identification;

an own ship parameter source in communication with said computer for providing own ship parameters, said own ship parameters comprising ship depth, ship speed, ambient noise level, depth of the bottom below ship, and ship radiated noise wherein said operational array selection and sonar system identification are linked to sonar system operating parameters including the array directivity index, minimal detectable signal level, array self noise and ambient noise level;

a target parameter source in communication with said computer for providing target parameters, said target parameters comprising target depth, target speed, target spectral characteristics, and target radiated noise;

an environmental parameter source in communication with said computer for providing environmental parameters, said environmental parameters comprising sea state, sound velocity profile, and shipping density; and application programs running on said computer and manipulating said operator parameters, said own ship parameters, said target parameters, and said environmental parameters to generate at least one range contour based on a predetermined probability of detection, said application programs providing said range contour to said display, said application programs manipulate said parameters in accordance with the following expression:

$$FOM=SL-(NL-DI+NRD)$$

where FOM represents the figure of merit, SL represents the target radiated noise, NL represents the ambient noise level, DI represents the array directivity index, and NRD represents the minimal detectable signal, said at least one range contour being calculated from said figure of merit and said probability of detection.

2. The system of claim 1 wherein:

said own ship parameters further comprise latitude, longitude, date, time, array heading, and array depth; and said target parameters further comprise target aspect.

3. The system of claim 2 wherein said operator parameters further comprise scenario parameters including assumed ship speed, assumed ship depth, operational array, assumed target depth, assumed target aspect, assumed target spectrum, assumed target speed, and assumed target radiated noise.

4. The system of claim 3 wherein said scenario parameters are used by said application programs, said application programs generating scenario range contours based on said probability of detection, said own ship parameters, said target parameters, said environmental parameters, and said scenario parameters and providing said scenario range contours to said display.

5. The system of claim 1 wherein said range contour is calculated using an acoustic propagation model receiving said figure of merit, said target parameters, and said environmental parameters.

6. The system of claim 1 further comprising a satellite interface joined to said computer and transmitting environmental parameters and target parameters to said computer.

7. The system of claim 6 wherein said satellite interface provides surface traffic data and surface weather data.

8. The system of claim 1 wherein said at least one range contour comprises a plurality of contours each contour representing a different predetermined probability of detection.

9. The system of claim 1 wherein said at least one range contour is a three dimensional surface.

10. A method for displaying the location of a target from a ship comprising:

receiving operator parameters including at least one probability of detection, operational array selection and sonar system identification;

providing own ship parameters comprising ship depth, ship speed, ambient noise level, depth of the bottom below ship, and ship radiated noise;

providing target parameters comprising target depth, target speed, target spectral characteristics, and target radiated noise;

providing environmental parameters comprising sea state, sound velocity profile, and shipping density;

linking said operational array selection and sonar system identification to sonar system operating parameters including the array directivity index, minimal detectable signal level, array self noise and ambient noise;

calculating at least one range contour based on said probability of detection, said operator parameters, said own ship parameters, said target parameters, and said environmental parameters, said step of calculating including the steps of:

calculating a figure of merit based on the following expression:

$$FOM=SL-(NL-DI+NRD)$$

where FOM represents the figure of merit, SL represents the target radiated noise, NL represents the ambient noise level, DI represents the array directivity index, and NRD represents the minimal detectable signal;

using an acoustic propagation model to calculate said probability of detection based on said calculated figure of merit, said target parameters, and said environmental parameters; and displaying said calculated range contour.

11. The system of claim 10 wherein:

said own ship parameters further comprise latitude, longitude, date time, array heading, and array depth; and said target parameters further comprise target aspect.

12. The method of claim 11, wherein said operator parameters further comprise scenario parameters including assumed ship speed, assumed ship depth, operational array, assumed target depth, assumed target aspect, assumed target spectrum, assumed target speed, and assumed target radiated noise.

13. The method claim 12 further comprising the steps of:

generating scenario range contours based on said probability of detection and said scenario parameters; and providing said scenario range contours to said display.

* * * * *